Patented Feb. 25, 1947

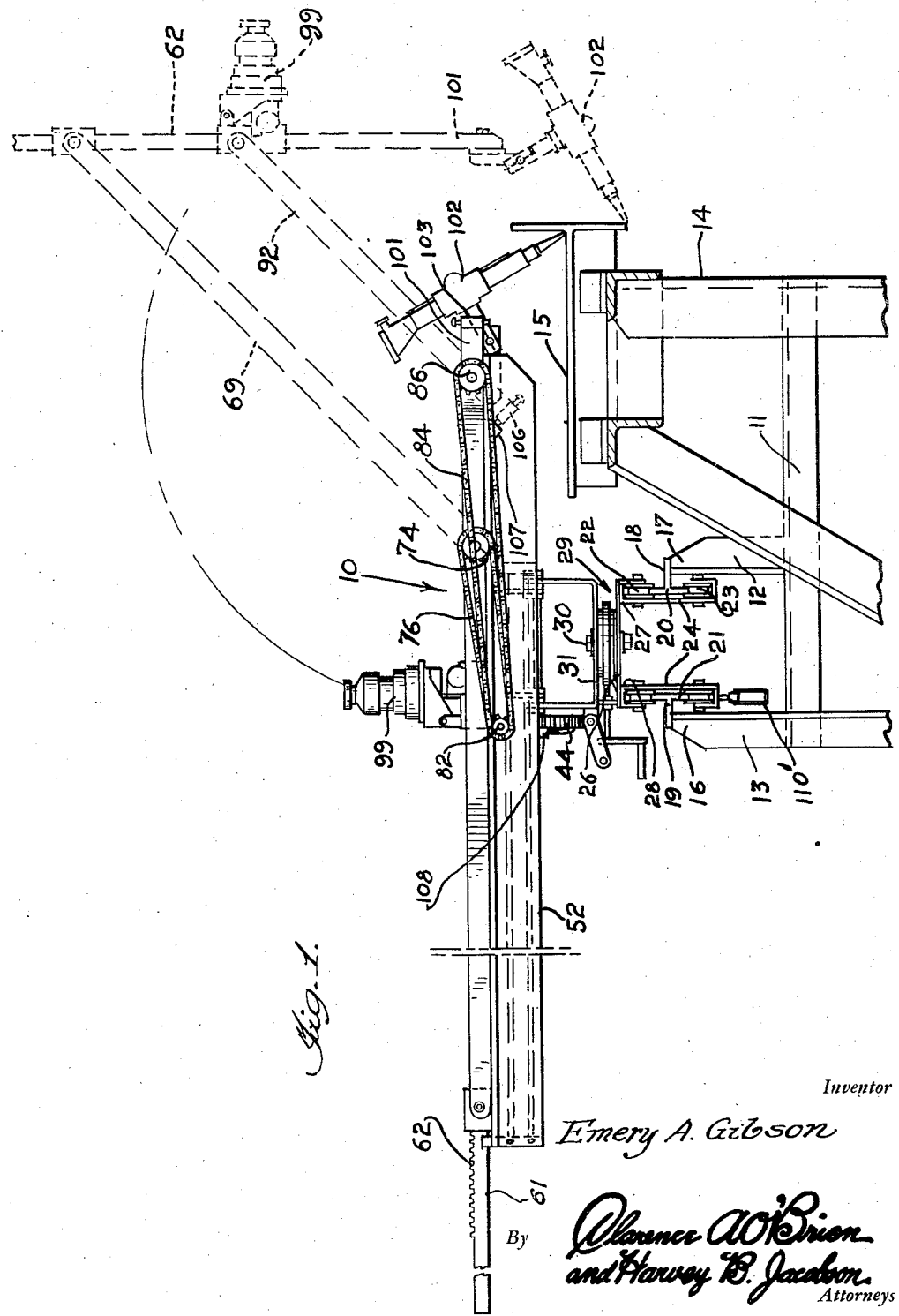

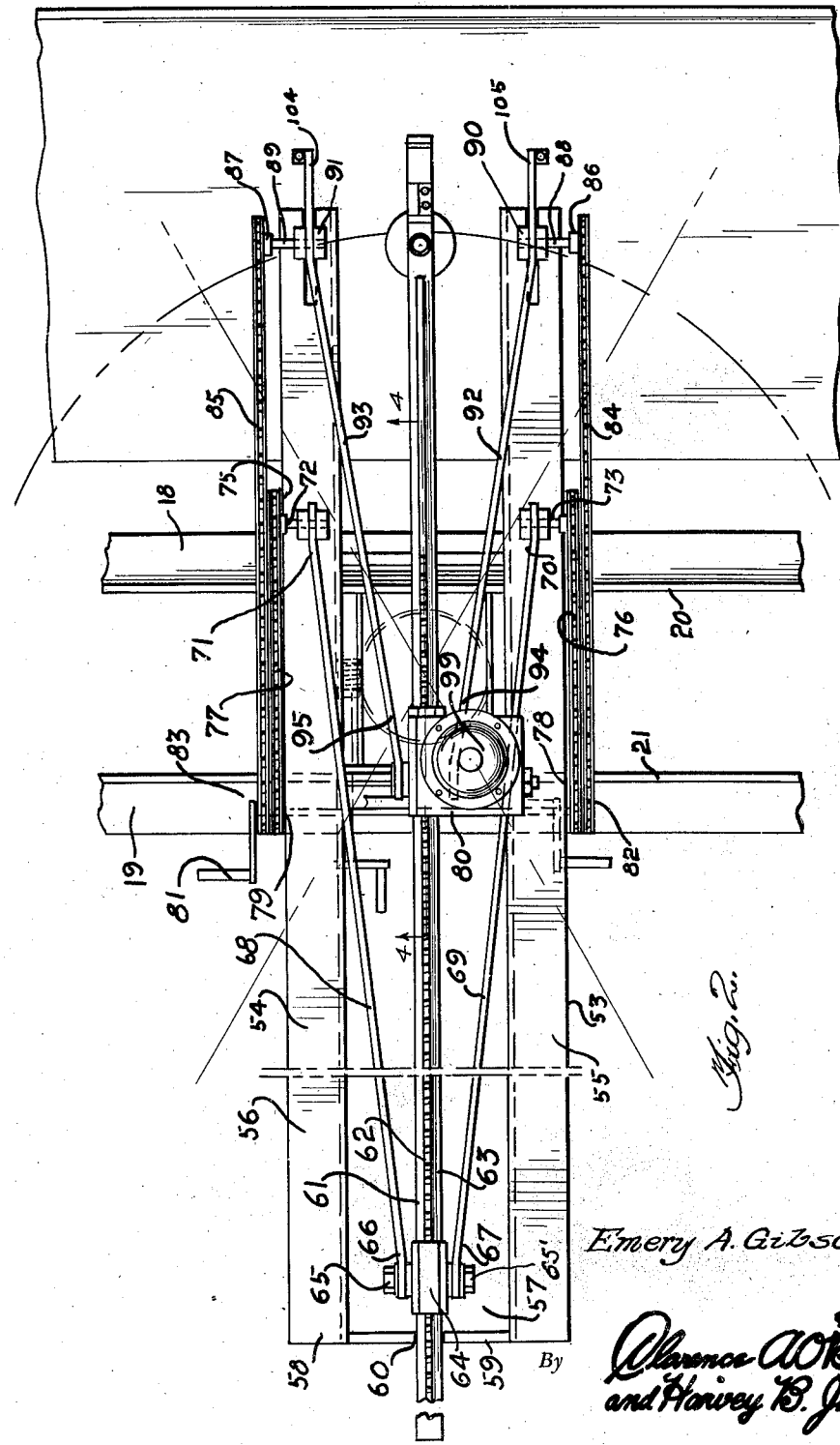

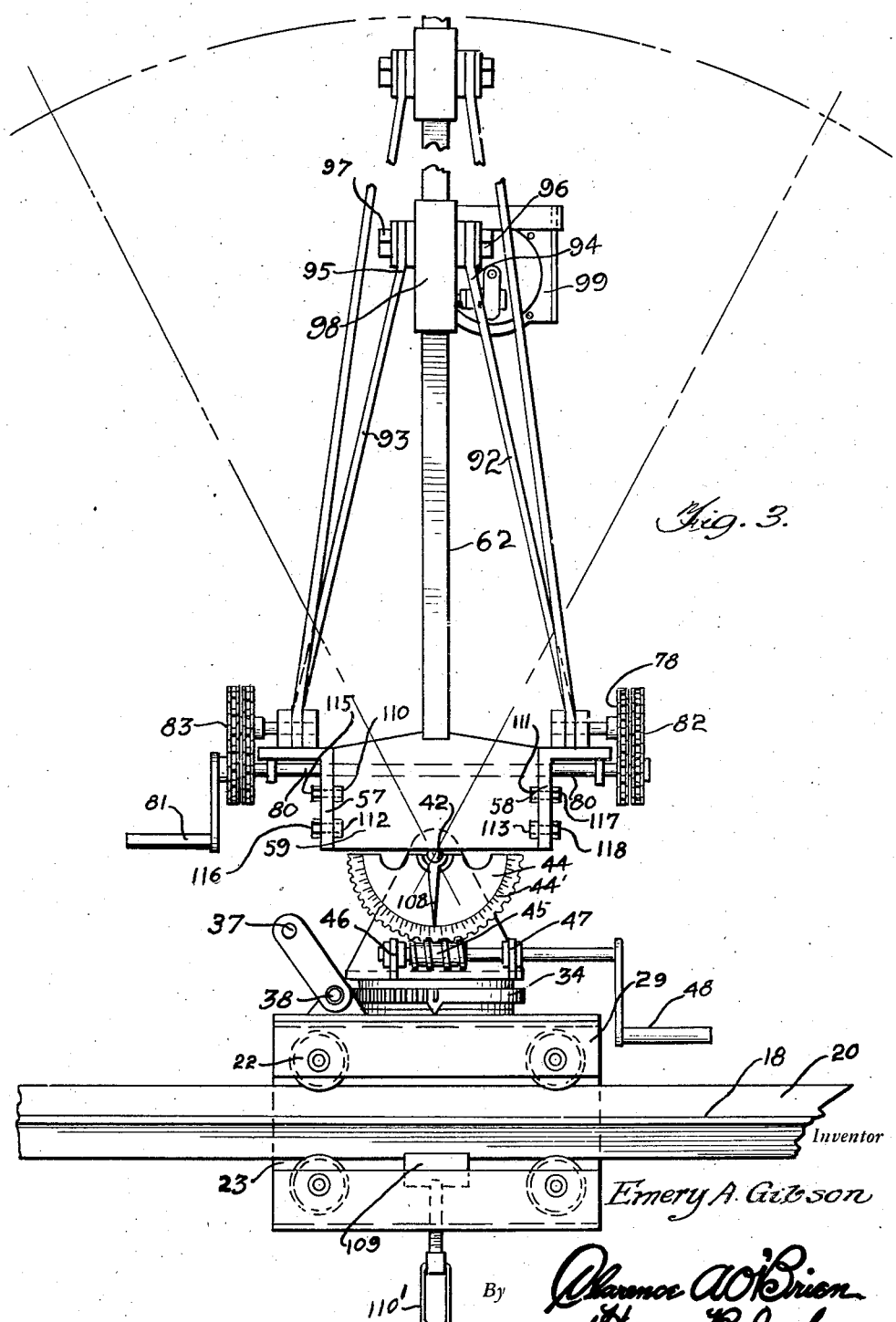

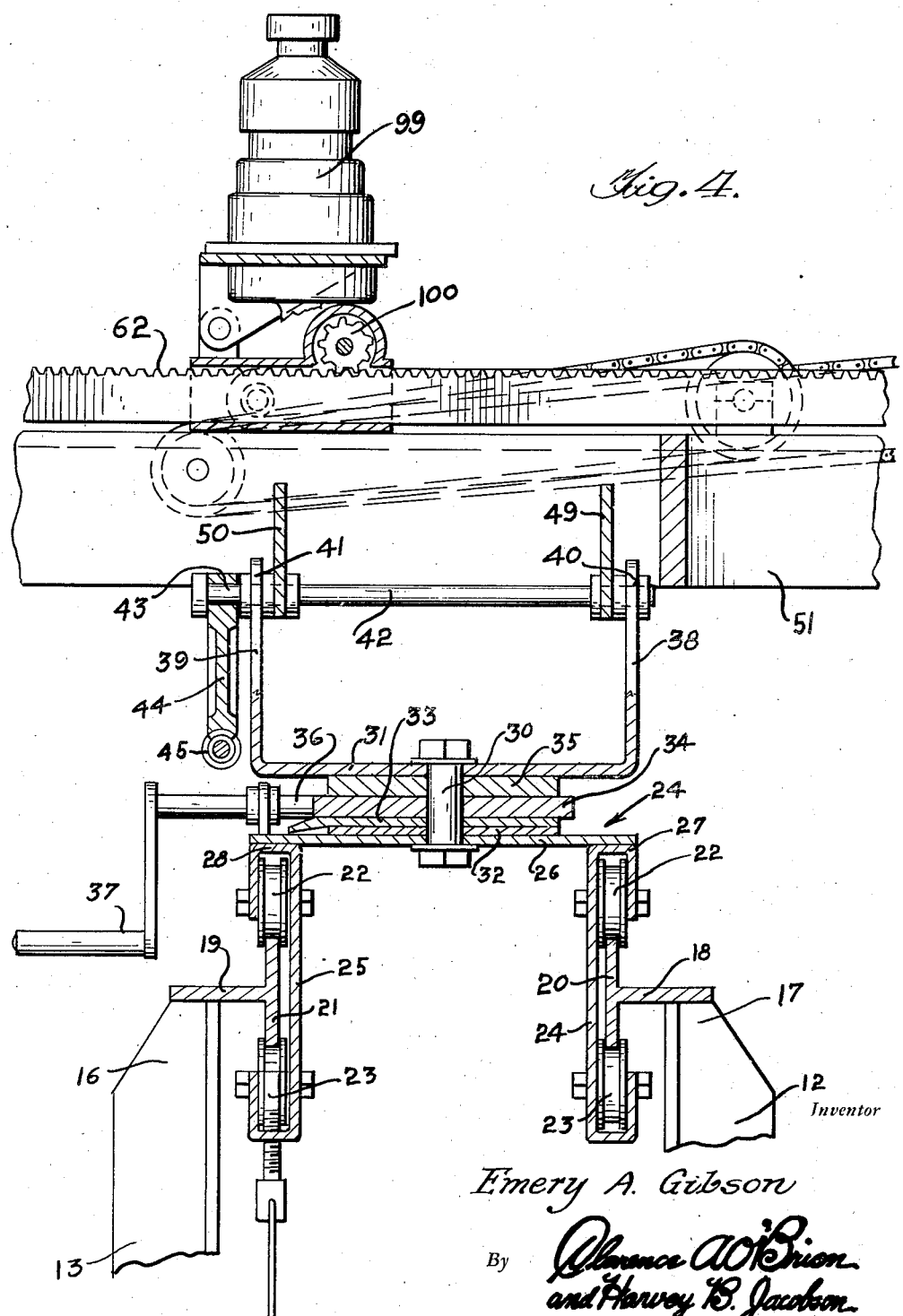

2,416,384

UNITED STATES PATENT OFFICE 2,416,384

TWO PLANE CUTTING MACHINE

Emery A. Gibson, Olympia, Wash.

Application July 11, 1945, Serial No. 604,442

5 Claims. (Cl. 266—23)

1

This invention relates to machines for precision cutting structural steel members in both horizontal and vertical planes or at any desired angle pertaining to one or both, and particularly to torch machines and has for its object to provide a pivotally and slidably mounted control.

Another object of the invention is to provide means whereby long angular cuts may be made in one continuous operation.

A further object of the invention is to provide in a torch cutting machine a pivotally mounted motor for actuating a torch arm.

Another object of this invention is to provide a motor driven torch actuating member.

Other features and advantages will become more readily apparent from the following description and the accompanying illustrative drawings in which:

Figure 1 is an elevational view of my machine,

Figure 2 is a top plan view thereof,

Figure 3 is an end elevational view of the machine shown in position, and

Figure 4 is a sectional elevation taken on line 4—4 of Figure 2.

The same reference characters indicate the same parts in the drawings and in the specification and in which 10, indicates my structural steel cutting machine which consists of a stand 11, upon members 12 and 13, for supporting the machine, and a table 14, for supporting the work 15, to be cut. The upper ends 16 and 17, of the members 12 and 13, carry tracks 18 and 19, formed of T-irons, on the heads 20 and 21, of which operate the channel wheels 22 and 23, connected by yokes 24 and 25, which with the angle calibration table 26, supported thereby and fixed to the upper ends 27 and 28, thereof form a carriage 29. Above said member 29, is pivotally mounted, by means of a pin 30, a turntable 31, between which members 26 and 31, are mounted, on said pin a spacer disk 32, and indicator disk 33, a gear wheel 34 and a spacer 35, all of the members 31, 32, 33, 34 and 35, being keyed to the pin 30. A worm gear 36, operated by a crank handle 37, is meshed with (but now shown) the gear 34, whereby said members 31 to 36, and the elements supported thereby are horizontally rotatable.

The table 31, is provided with vertically disposed integral arms 38 and 39, the upper terminals 40 and 41, of which form bearings for a horizontal pivot rod 42, upon the end 43, of which is keyed a segmental gear 44, meshed with a worm gear 45, supported in bearings 46 and 47. This gear 45, is also controlled by a crank arm 48.

Fixedly mounted upon the shaft 42, are spaced

2 plates 49 and 50, which are mortised and bolted at their respective ends to the flanges 51 and 52, of inverted L-irons 53 and 54, the horizontal flanges 55 and 56, of which form a mounting for the torch controlling mechanism about to be described.

The rear ends 57 and 58, of said members 53 and 54, are fixed across plate 59, provided with a slot 60, within which may be seated the base 61, of an elongated rack bar 62, upon the rear portion 63 of which is secured a bearing member 64, by pins 65 and 65' upon which are pivotally mounted the rear ends 66 and 67, of elevating arms 68 and 69, the forward ends 70 and 71, are fixed to stub shafts 72 and 73, fixed to sprocket wheels 74 and 75. Trained over these sprockets are chains 76 and 77, operating over sprockets 78 and 79, fixed on a shaft 80, rotatable by a crank handle 81.

Also fixedly mounted on shaft 80, at opposing ends thereof are sprockets 82 and 83, driving chains 84 and 85, in turn trained over sprockets 86 and 87, fixed on stub shafts 88 and 89, which have bearings at 90 and 91, of the elevating arms 92 and 93, the ends 94 and 95, of which are brought together and pivoted on bolts 96 and 97, carried by a slide 98, through which member 61, slides, hingedly mounted upon the slide 98, is an electric motor 99, which drives the gear 100, adapted to mesh with rack 62. The hinge mounting permits to disengage the gear wheel from the rack 62 if desired.

On the forward end 101, of said member 62, is carried a torch 102, by means of an inversion knuckle 103, whereby the torch may be adjusted to any desired angle. The extending ends 104 and 105, of members 92 and 93, are provided with adjustable stops 106, engageable with a member 107, carried on member 52, whereby the elements of bar 62, may be adjusted in secure angular position (see Figure 1), for true vertical position of bar 62, when cutting in vertical plane.

The segmental gear 44, is calibrated as at 44', by means of which calibration taken with the pointer 108, the member 62, may be adjusted to any desired upright angular position.

The operation of the device is as follows:

The entire machine 10 is moved on track 20 and 21 to the desired position of the cut on work 15, and is locked in position by means of screw clamp 109, actuated by pivoted handle 110'. By means of crank 37 the adjustment to the desired horizontal angle of cut is performed which is indexed on calibration 26. A further adjustment is made by means of crank 48 which serves to obtain the desired vertical angle of cut, which is indexed on calibration 44¹, as indicated by 108. At means of inversion knuckle 103, the torch is adjusted to the desired bevel of cut.

With rack bar 62, in horizontal position a horizontal cut on work 15, is made; then the torch is returned to clear flange after disengaging the motor and pushing it back manually the rack bar 62 is raised by means of crank 81 to vertical position and the vertical cut on flange of work 15 is made. To accomplish the diagonal length or long angular cut the head of the machine is moved on the carriage of machine 50—51 on mortised track 110—111—112—113 and is locked in position by screws 115—116—117—118.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A machine for controlling a cutting torch comprising a carriage, a turntable thereon, a pivoted bar for carrying the torch, means for acuating said bar to raise and lower the same, means for longitudinal movement of the bar, said last means being a motor hingedly mounted adjacent said bar, said bar being a rack bar and said motor including a gear adapted to mesh with the rack, a pivotally supported mount for the bar, a segmental gear for actuating said support and forming an inclinometer, said carriage having a calibrated surface and said turntable having a pointer operating over the calibrations.

2. A machine for controlling a cutting torch comprising a carriage, a turntable thereon, a pivoted bar for carrying the torch, means for actuating said bar to raise and lower the same, means for longitudinal movement of the bar, said last means being a motor hingedly mounted adjacent said bar, said bar being a rack bar and said motor including a gear adapted to mesh with the rack, a pivotally supported mount for the bar, and a segmental gear for actuating said support and forming an inclinometer.

3. A machine for controlling a cutting torch comprising a carriage, a turntable thereon, a pivoted bar for carrying the torch, means for actuating said bar to raise and lower the same, means for longitudinal movement of the bar, said last means being a motor hingedly mounted adjacent said bar, said bar being a rack bar and said motor including a gear adapted to mesh with the rack, and a pivotally supported mount for the bar.

4. A machine for controlling a cutting torch comprising a carriage, a turntable thereon, a pivoted bar for carrying the torch, means for actuating said bar to raise and lower the same, means for longitudinal movement of the bar, said last means being a motor hingedly mounted adjacent said bar, and said bar being a rack bar and said motor including a gear adapted to mesh with the rack.

5. A machine for controlling a cutting torch comprising a carriage, a turntable thereon, a pivoted bar for carrying the torch, means for actuating said bar to raise and lower the same, means for longitudinal movement of the bar, and said last means being a motor hingedly mounted adjacent said bar.

EMERY A. GIBSON.

REFERENCES CITED

The following references are of record in the file of this patent:

UNITED STATES PATENTS

| Number | Name | Date |
| --- | --- | --- |
| 1,068,721 | Whitford | July 29, 1913 |
| 1,390,600 | Bucknam | Sept. 13, 1921 |
| 1,172,933 | Bucknam | Feb. 22, 1916 |
| 1,176,584 | Madgett | Mar. 21, 1916 |
| 2,017,430 | Anderson | Oct. 15, 1935 |
| 2,296,832 | Bowers | Sept. 29, 1942 |
| 2,356,197 | Jones et al. | Aug. 22, 1944 |